United States Patent [19]

Theysohn

[11] 4,327,859

[45] May 4, 1982

[54] METHOD OF COATING DUAL-WORM EXTRUDER BORES

[75] Inventor: Friedrich Theysohn, Hanover, Fed. Rep. of Germany

[73] Assignee: Firma Friedrich Theysohn, Langenhagen, Fed. Rep. of Germany

[21] Appl. No.: 127,424

[22] Filed: Mar. 5, 1980

Related U.S. Application Data

[63] Continuation-in-part of Ser. No. 958,527, Nov. 7, 1978, abandoned.

[30] Foreign Application Priority Data

Nov. 22, 1977 [DE] Fed. Rep. of Germany ....... 2752002

[51] Int. Cl.$^3$ .............................................. B23K 20/08
[52] U.S. Cl. ............................ 228/107; 219/121 ED
[58] Field of Search ....................... 228/107, 108, 109; 219/121 ED

[56] References Cited

U.S. PATENT DOCUMENTS

| | | | |
|---|---|---|---|
| 3,140,537 | 7/1964 | Popoff | 228/108 |
| 3,292,253 | 12/1966 | Rossner et al. | 228/107 |
| 3,728,780 | 4/1973 | Chang | 228/109 X |

FOREIGN PATENT DOCUMENTS

| | | | |
|---|---|---|---|
| 957186 | 11/1974 | Canada | 228/107 |
| 1527903 | 5/1973 | Fed. Rep. of Germany. | |
| 41-8211 | 4/1966 | Japan | 228/107 |
| 42-1846 | 1/1967 | Japan | 228/107 |
| 49-15333 | 4/1974 | Japan | 228/107 |

*Primary Examiner*—Robert D. Baldwin
*Attorney, Agent, or Firm*—Spencer & Kaye

[57] ABSTRACT

A method of providing a wear-resistant layer on the inner bore faces of the housing of a dual-worm extruder having two longitudinally communicating parallel bores for accommodating extruder worms therein. According to the method, a relatively soft sheet metal blank and a relatively hard, wear-resistant sheet metal blank are metallurgically bonded to one another in a face-to-face relationship, then the thus obtained "sandwich" is deformed into two longitudinally open tubular blanks, with the relatively soft sheet metal blank forming the outer, convex side of each tubular blank. Thereafter, the tubular blanks are welded to one another along respective longitudinal edges thereof for obtaining a composite body having a cross-sectional outline of a FIG. 8, generally corresponding to, but being smaller than the cross-sectional outline of the bores. Then the composite body is introduced into the housing in a substantially coaxial relationship with the bores, and an explosive is placed in the space surrounded by the composite body and the explosive is ignited for effecting a plating of the inner bore faces with the composite body.

9 Claims, 9 Drawing Figures

FIG. 1
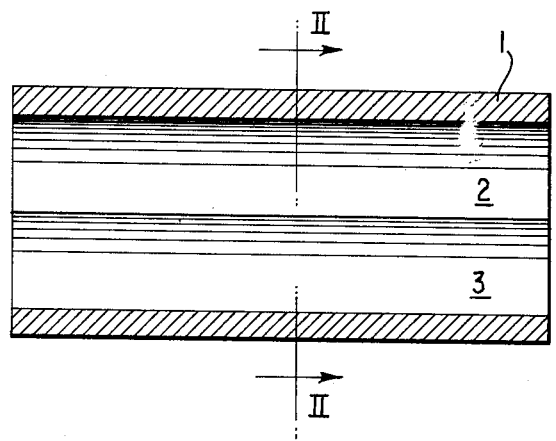
FIG. 2
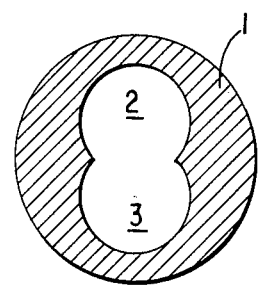
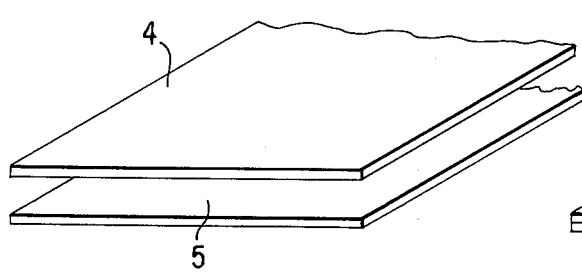
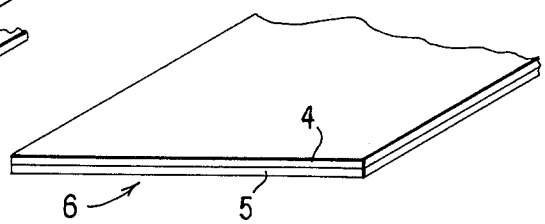
FIG. 3        FIG. 4

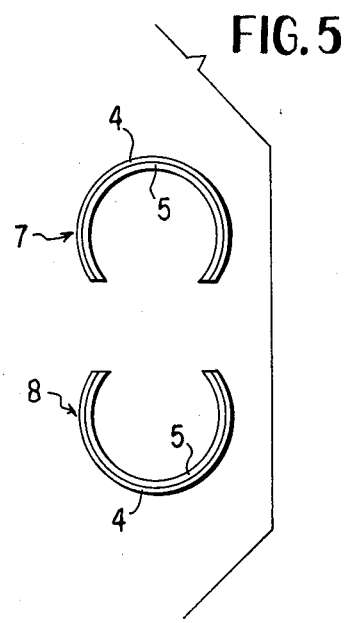
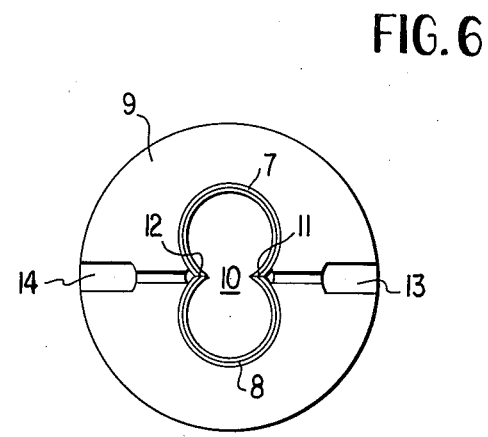
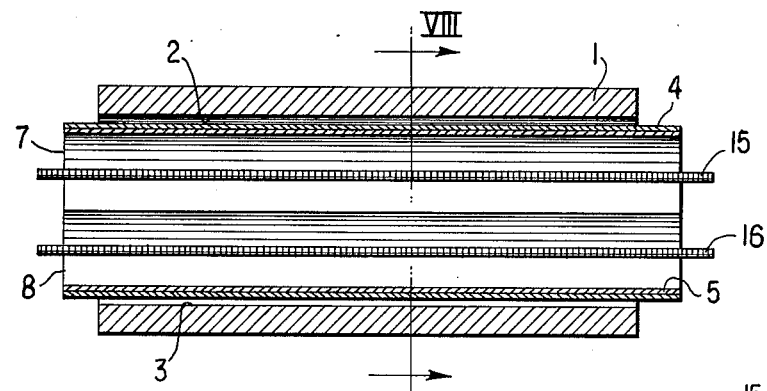
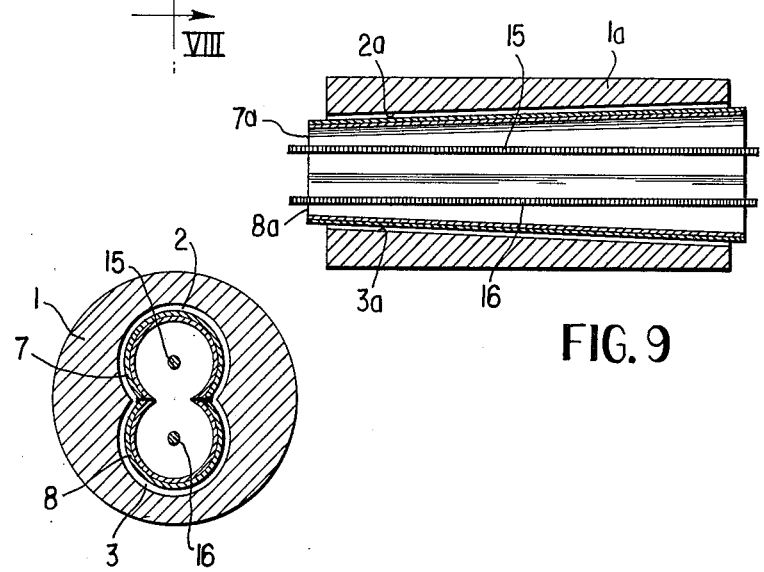

METHOD OF COATING DUAL-WORM EXTRUDER BORES

CROSS-REFERENCE TO RELATED APPLICATION

This is a continuation-in-part of copending Application Ser. No. 958,527 filed Nov. 7th, 1978, now abandoned.

BACKGROUND OF THE INVENTION

This invention relates to a method of providing, in a dual-worm extruder, a wear-resistant layer on the inner surface of the housing bore which accommodates two parallel-extending extruder worms and has, accordingly, an approximate cross-sectional shape of a figure "8".

Extruder or injection machines are widely used in many fields for making bodies of plastics or rubber. Extruders are known which have only a single worm or which have two axially parallel, cooperating worms for advancing the material to be injected. A dual worm has, as compared to a single worm, the advantage that the material is discharged in a more uniform manner. The housing for such a dual worm is so structured that the bore has, in cross section, the shape of an open figure "8", that is, both housing parts for the worms are open at the parting plane. There are known dual worm extruders which are provided with cylindrical housing bores and extruders are further known in which the bores (and thus the worms as well) have a conical shape. Such a conical configuration is of advantage, since the pressure required for discharging the material is easier to generate.

Since the worms rotate in the extruder housing and since the clearance between the worms and the housing has to be very small to ensure that the required pressure can be built up, the inner surface of the housing bore is exposed to a continuous wear. Consequently, this surface has to be particularly wear resistant. Heretofore, as a rule, this surface has been either hardened by a special heat treatment or has been provided with a thin layer of wear-resistant material applied by a centrifugal coating process at relatively high temperatures. Both processes, however, involve very significant expense and require substantial subsequent finishing work. Particularly in case of centrifugal coating often shrinkages occur on the surface which cannot be remedied by a subsequent treatment so that the entire extruder housing has to be eliminated as waste.

SUMMARY OF THE INVENTION

It is an object of the invention to provide an improved method for the above-outlined purpose which makes possible a coating of the inner housing surface with a wear-resistant material in a simple manner irrespective of whether the bores of the housing of the dual-worm extruder are cylindrical or conical.

This object and others to become apparent as the specification progresses, are accomplished by the invention, according to which, briefly stated, there are introduced into the bore two appropriately cut and preformed sheet metal pieces each formed of a wear-resistant metal and a relatively soft metal bonded thereto. The soft metal is oriented towards the bore wall. The two sheet metal pieces are bonded (welded) to one another along the entire length of their two edges. After introducing this plating assembly into the extruder bore, an explosive is ignited in the space surrounded by the sheet members, whereby the sheet members are, with their soft-metal side, firmly bonded to the bore wall.

By utilizing explosive plating which is known in many fields of technology, with a particular, 2-layer plating material as outlined above, it is feasible to provide the relatively complex shapes of the bores of a dual-worm extruder in a simple manner with a layer of wear-resistant material. By using this process there is no need for any subsequent finishing treatment and further, wastes will not occur. The relatively soft metal layer of the 2-layer plating sheet forms a firm, high-quality bond—made prior to the explosive step proper—with the wear-resistant material and, as a result of the explosive process, it forms a very satisfactory bond with the bore wall. The method according to the invention finds particularly advantageous application in case of a dual-worm extruder having conical bores, since even in case of a complex bore shape of this type, a wear-resistant layer can be provided in a simple manner without great expense.

Austrian Pat. No. 232,354 and German Pat. No. 1,527,903 disclose explosive plating of the inside of smooth cylindrical tubes. This prior art merely describes that with a special process individual tubes may be provided at their inner face with a one-piece member made of a different material. Such individual tubes can be regarded as a housing with a circular inner cross-sectional shape which can be plated with a continuously extending, circular layer. These two patents, however, do not suggest in any way that by means of the explosive plating process, surfaces can be plated which deviate from a circular shape and which, in particular, have discontinuities as it is the case in a housing of a dual-worm extruder. Further, the use of two sheet members in two chambers for the simultaneous, common plating of both bores of a dual-worm extruder is also not suggested in the above prior art.

U.S. Pat. No. 3,728,780 discloses explosive cladding in which a 2-layer material is used. One of the layers is the cladding metal proper which is oriented towards the face of the base metal and is thus to be directly bonded thereto. The other layer which thus faces away from the base metal, is a buffer material for the sole purpose of protecting the surface of cladding material from harmful explosion products and to prevent cracking of the cladding material due to thermal stress. Thus, the "buffer" material does not participate in the bond between the cladding and the metal base.

BRIEF DESCRIPTION OF THE DRAWING

FIG. 1 is a schematic axial sectional view of a housing of a dual-worm extruder.

FIG. 2 is a sectional view taken along line II—II of FIG. 1.

FIGS. 3, 4 and 5 are schematic illustrations of the first three consecutive steps of the method according to the invention.

FIG. 6 is a schematic end view of a device for welding preformed sheet metal components to one another in another step of the method according to the invention.

FIGS. 7 and 8 are sectional views similar to FIGS. 1 and 2, showing the sheet metal plating assembly and the explosive in place prior to the explosive plating step.

FIG. 9 is a sectional view similar to FIG. 7, illustrating an extruder housing having conical bores.

DESCRIPTION OF THE PREFERRED EMBODIMENT

Turning now to FIGS. 1 and 2, there is schematically shown a housing 1 of a dual-worm extruder. It has two parallel-arranged cylindrical bores 2 and 3 which, as shown in the cross-sectional illustration of FIG. 2, have together the shape of an open figure "8". The two bores 2 and 3 each accommodate a separate worm (not illustrated) for advancing the material to be extruded or injected. The bores 2 and 3 are open along their contacting portions and thus communicate with one another. The housing 1 of such an extruder is, for example, steel and has to be provided on the inner face of the bores 2 and 3 with a wear-resistant layer, since the worms are arranged very closely to these surfaces and consequently, the latter are exposed constantly to wear.

In the description which follows, the process for forming a wear-resistant layer on the bore faces according to the invention will be discussed.

As illustrated in FIGS. 3 and 4, a sheet metal blank 4 made of a relatively soft material such as, for example, structural steel which has a strength of approximately 30 kg/mm is metallurgically firmly bonded, in a face-to-face relationship, with a second sheet metal blank 5 which is the desired wear-resistant layer proper and which may be, for example, high-alloyed steel. The two sheets 4 and 5 may be bonded to one another by hot rolling.

Subsequently, the composite sheet metal assembly 6 is bent into longitudinally open tubular components 7 and 8 (FIG. 5), which generally correspond to the configuration of the one and the other bore 2 and 3 of the extruder housing 1 and in which the relatively soft layer 4 is at the outside and the wear-resistant layer 5 is at the inside.

Then the parts 7 and 8 are introduced into a welding jig 9 illustrated in FIG. 6. The jig 9 has a housing provided with a composite bore 10 which generally corresponds to the shape of the extruder housing to be subsequently treated but which has slightly lesser dimensions. The sheet metal members 7 and 8 are inserted into the bore 10 as shown in FIG. 6. The abutting edge zones 11 and 12 of the two sheet members 7 and 8 are accessible through openings 13 and 14 provided in the jig 9 for welding the two components 7 and 8 to one another, for example, by means of a conventional electron beam welding process.

After the above-described welding operation, the welded plating assembly 7, 8 is removed from the jig 9 and is introduced into the extruder bores 2 and 3 in which they assume a position as shown in FIGS. 7 and 8. The welded plating assembly 7, 8 projects at opposite ends beyond the bores and is secured to the housing 1 in such a manner that there remains a small clearance between the outer face of the plating assembly and the inner surfaces of the bores 2 and 3. Thus, the sheet metal plating assembly faces the inner walls of the bores 2 and 3 with the relatively soft layer 4 whereas the wear-resistant layer 5 is oriented inwardly towards the hollow space.

Further, a rod-like explosive charge 15 and 16 is introduced into the space surrounded by the sheet metal plating assembly 7, 8. Upon igniting the explosive, the sheet metal plating assembly 7, 8 is, as a result of the explosive force, accelerated towards the surfaces of the bores 2 and 3 and pressed thereagainst. As a result of the explosion, the sheet metal plating assembly is firmly bonded (plated) to the inner bore faces 2 and 3.

It is apparent that in addition to superior wear-resistant properties, the applied wear-resistant layer has to form a high-quality, durable bond with the housing material at the inner bore faces. An explosive plating of the relatively hard wear-resistant layer 5 directly to the bore face was not found to result in a sufficiently firm and durable bond with the housing material. It has been found, especially when operating the extruder with different temperature cycles, that the bond between the wear-resistant layer and the housing material has separated. The relatively softer sheet metal layer 4 thus serves for bridging the bonding incompatibilities between the housing material and the wear-resistant layer. The previously-provided metallurgical bond between the softer layer 4 and the wear-resistant layer 5 as well as the bond, formed by explosive plating, between the softer layer 4 and the housing material have both been found to be of superior quality, thus making an explosive plating process feasible in this particular environment. Further, the better bonding qualities of the softer layer simplify the manufacture of the extruder inasmuch as no particular preparation of the inner bore faces is necessary as it has been the case when a direct explosive plating with the wear-resistant material has been attempted. On the contrary, leaving the inner faces of the extruder bores 2 and 3 relatively coarse was found to enhance the bonding with a relatively soft material due to the anchoring effect because of the larger surface contacts.

The explosive charges 15 and 16 which may be blast charges of the type disclosed in German Pat. No. 1,527,903, may extend along the entire length of the space surrounded in the bores 2 and 3 by the sheet metal assembly formed of components 7 and 8. As an alternative, it is feasible to provide the inner face of the welded assembly, that is the outer face of the wear-resistant material 5, before its introduction into the housing 1 of the dual-worm extruder, with an explosive film, as described, for example, in German Pat. No. 1,267,519. The explosive charges, whether rod or film, are ignited at one end so that in both cases, the sheet metal members 7 and 8 progressively plate the inner surfaces of the bores 2 and 3.

Turning now to FIG. 9, while the explosive plating process according to the invention is described in connection with cylindrical cylinder bores 2 and 3, it is feasible to practice this method, for example, in case of a dual-worm extruder housing 1a having conical bores 2a and 3a. In such a case the sheet metal plating assembly 7a, 8a too, has a conical configuration and the bore of the welding jig 9 is shaped accordingly.

Subsequent to the explosive plating process as described above, no finishing treatment of the inner surface of the extruder housing is necessary; merely the residual sheet metal parts and all other components that were necessary for sealing the explosion chamber need to be removed.

It will be understood that the above description of the present invention is susceptible to various modifications, changes and adaptations, and the same are intended to be comprehended within the meaning and range of equivalents of the appended claims.

What is claimed is:

1. A method of providing a wear-resistant layer on the inner bore faces of the housing of a dual-worm extruder having two longitudinally communicating parallel bores for accommodating extruder worms therein; the bores having, when viewed cross-sectionally, the shape of a figure 8, comprising the following steps:

(a) metallurgically bonding to one another a relatively soft sheet metal blank and a relatively hard, wear-resistant sheet metal blank in a face-to-face relationship;

(b) deforming two blank components obtained in step (a) into two longitudinally open tubular blanks with said relatively soft sheet metal blank forming the outer, convex side of each tubular blank; each tubular blank having diametral and length dimensions that generally correspond to those of the respective said housing bores;

(c) welding the tubular blanks to one another along respective longitudinal edges thereof for obtaining a composite body having a cross-sectional outline of a figure 8, generally corresponding to, but being smaller than the cross-sectional outline of said bores;

(d) introducing said composite body into said housing in a substantially coaxial relationship with said bores;

(e) introducing an explosive in the space surrounded by said composite body; and (f) subsequent to step (e), igniting the explosive for effecting a plating of said inner bore faces with said composite body.

2. A method as defined in claim 1, wherein step (e) is performed simultaneously with step (d).

3. A method as defined in claim 2, further comprising the step of providing the inner faces of said composite body with an explosive foil prior to step (d).

4. A method as defined in claim 1, wherein step (e) is performed subsequently to step (d).

5. A method as defined in claim 4, wherein said step (e) comprises the introduction of an elongated blast charge into said space.

6. A method as defined in claim 1, wherein the igniting step comprises the step of igniting the explosive at one end.

7. A method as defined in claim 1, wherein the welding step comprises electron beam welding.

8. A method as defined in claim 1, wherein said bores are cylindrical.

9. A method as defined in claim 1, wherein said bores are conical.

* * * * *